ETHYLENE POLYMERIZATION VERSUS TIME
EXPERIMENT NO. 1351-38

United States Patent Office 3,236,911
Patented Feb. 22, 1966

3,236,911
POLYMERIZATION OF ETHYLENE WITH DIBORANE-TREATED CATALYSTS
Wilfrid G. Shaw and Neva L. Cardon, Cleveland, Ohio, assignors to The Standard Oil Company, Cleveland, Ohio, a corporation of Ohio
Filed Dec. 27, 1960, Ser. No. 78,564
2 Claims. (Cl. 260—683.15)

This invention relates to a diborane-treated cobalt oxide active supported catalyst that polymerizes ethylene at moderate temperatures and low pressure without high polymer formation. These low molecular weight polymers may be used as alkylation feed materials or as gasoline components. Developing uses for ethylene is important because presently ethylene has little economic value as a gasoline component. Experiments have revealed that metal oxide alone will not polymerize ethylene, and that diborane-treated catalysts without the cobalt oxide will not polymerize ethylene under moderate conditions.

Catalysts of various commercial and experimental oxides have been diborane-treated to form catalysts having improved catalytic activity. These catalysts were tested for polymerization and isomerization activity at 0° to 100° C. and at sub-atmospheric pressures. When ethylene was passed over the diborane-treated CoO supported on an acidic catalyst support conversions of 15 to 70% per pass were obtained. The untreated CoO supported on the same support showed no ethylene polymerization.

Figure 1:
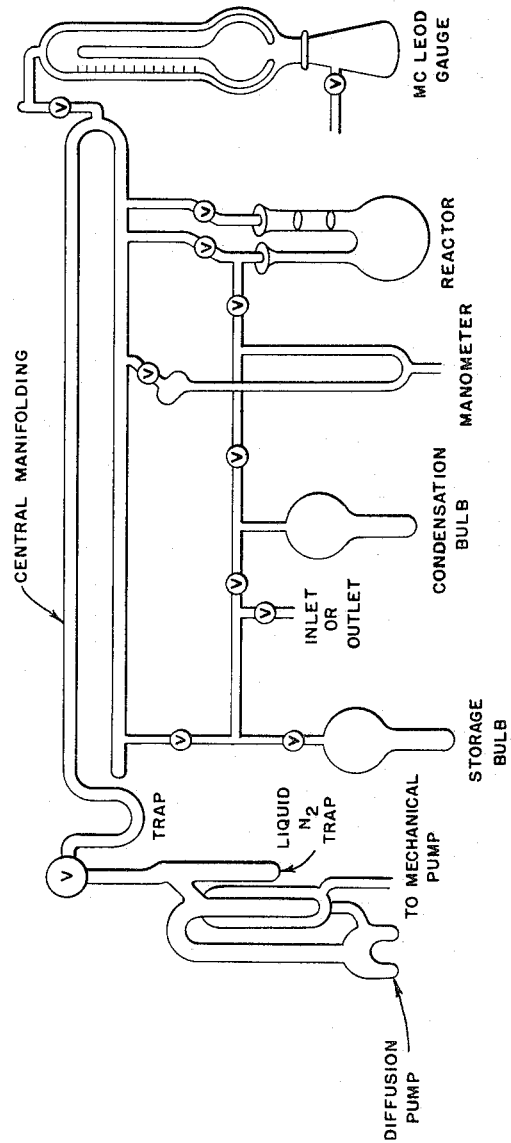

FIGURE 1 is a schematic diagram of an apparatus suitable for use in connection with the invention.

The experimental apparatus is an integrated versatile vacuum system with interconnecting equipment for introducing, storing, reacting, isolating, and removing materials. Instruments and measuring gages for determining the properties and studying the material reactions are also part of the system. The unit is attached to 4½ by 5½ foot steel frame mounted in a walk-in type hood. The individual components of the system are connected by two central manifolding tubes running parallel near the front and rear of the assembly and extend the length of the system. These tubes are 22 mm. in diameter and have few bends or constrictions making for greater ease and speed of evacuation. A McLeod gauge measuring pressure to the order of $10^{-6}$ mm. of mercury is attached to one end of the manifold. A Cenco Hyvac mechanical pump and a mercury diffusion pump are connected to the manifold tubes at the end opposite the McLeod gauge. The pumps are connected to the system through a nitrogen immersed trap which prevents mercury and vapor diffusion.

Gases or volatile liquid materials are introduced into the system through the inlet tube and stored or condensed in one of the two bulbs of 1000 ml. capacity. Heavy walled 10-ml. Pyrex tubing connects parts of the system, and stopcocks are so placed as to isolate any section as desired. A calibrated condensation bulb with a manometer accurately measures minutes pressure changes.

A long two-necked flask is the reactor for the diborane treatment of catalysts and for the catalytic activity measurements. The wider of the two necks contains a porous fritted disk to support the catalyst bed. Accurate reaction temperature measurements were made by a thermocouple well in the catalyst bed. After carefully degassing the glass system by heating, a vacuum of $10^{-6}$ mm. of mercury is maintained.

CATALYST PREPARATION

The diborane-treated catalysts were:
(1) A commercial (Houdry M-46) silica alumina catalyst (87% silica and 13% alumina).
(2) Cobalt oxide on silica alumina (5% CoO—84% SiO—11% $Al_2O_3$).

Ten grams of the catalyst to be diborane-treated were placed on the porous fritted disk in the two-necked flask reactor (FIGURE 1) and heated for 15 minutes under vacuum at below 100° C. Diborane was introduced into the system from a cylinder through an inlet tube. Circulation through the catalyst bed was achieved by condensation and subsequent vaporization of the diborane at half hour intervals. The catalyst substrate may be preferably of a neutral or an acidic type, including materials such as silica, alumina-magnesia, or silica-alumina-magnesia. The substrate was exposed to the diborne for four hours at ambient temperature. In the case of alumina-silica, the proposed amount of $Al_2O_3$ to $SiO_2$ may be from 5 to 25% $Al_2O_3$ and the balance $SiO_2$.

Table I
PREPARATION OF DIBORANE CATALYSTS

| $B_2H_6$ Treated Catalyst | Millimoles $B_2H_6$ Used/g. Catalyst | Moles $H_2$ Formed, Moles $B_2H_6$ Used |
|---|---|---|
| Houdry M-46—87% $SiO_2$—13% $Al_2O_3$ | 0.36 | 1.06 |
| Houdry M-46—87% $SiO_2$—13% $Al_2O_3$ | 0.45 | 1.59 |
| 5% CoO—84% $SiO_2$—11% $Al_2O_3$ | 0.34 | 1.65 |
| 5% CoO—84% $SiO_2$—11% $Al_2O_3$ | 0.51 | 1.69 |
| 5% CoO—84% $SiO_2$—11% $Al_2O_3$ | 0.48 | 1.86 |

Table I summarizes the preparation of diborane-treated catalysts. The table lists the catalytic substrate composition as well as the amount of diborane reacted with the substrate expressed as millimoles of diborane per gram of catalyst. Hydrogen is evolved when catalysts with available hydroxyl groups or associated water are exposed to diborane. Pressure change measurements indicate the amount of hydrogen evolved, the amount of diborane introduced, and the residual of unreacted diborane to show the extent of the reaction of diborane with the catalytic surface. The diborane-treated catalysts were stored in the evacuated reactor until tested for polymerization activity.

Two methods were used to measure diborane-treated catalyst stability. Attempts to remove $BH_2$ groups by the known methods of reacting with methanol or water at room temperature could remove no more than 30% of the $BH_2$ associated with the catalyst as indicated by the theoretical amount of hydrogen expected for the complete reaction. This catalyst stability could be demonstrated both before and after the use of the catalyst in polymerization. Alkyl borane formation appeared when ethylene first contacted the freshly diborated $$CoO—SiO_2—Al_2O_3$$

but no alkyl boranes were found subsequently. After six successive ethylene polymerization runs, the presence of $BH_2$ groups were still detected on the catalyst by infra red spectra analysis. Instead of the silica alumina support, any known active support may be used, such as alumina, alumina-magnesia, silica-alumina-magnesia.

CATALYTIC ACTIVITY

Diborane-treated catalysts were tested for ethylene polymerization activity and n-pentane isomerization.

The catalytic reaction temperature generally was 20° C. to 22° C. but any temperatures between 0 to 100° C. may be used. Pressure was atmospheric or sub-atmospheric approximately 0.5 atmosphere for ethylene polymerization and somewhat lower initially for n-pentane isomerization. Pressure is not critical and it is an advantage of the invention that low pressures can be used (even as low as or less than 1.5 atmospheres so that glass apparatus may be used if desired).

Polymerized products were separated from unreacted olefins by fractionations. Successive traps were cooled at —78° C. to —195° C. The —78° C. fraction was condensed in sampling tubes with carbon tetrachloride as the diluent. Adsorbed products were collected separately during catalyst bed heating at 100° C. to permit desorption. Polymerization was measured by the amount of olefin consumed. Reactivity was measured by comparing feed and product chromatographs.

*Table II*

ETHYLENE POLYMERIZATION USING $B_2H_6$ TREATED CoO—$SiO_2$—$Al_2O_3$ CATALYST

| Temp., °C. | Press., Atmos. | Time, Hrs. | Ethylene Reacted and/ or Adsorbed, Percent | Number of Products Recovered |
|---|---|---|---|---|
| 21 | 0.645 | 4 | 67 | 16. |
| 21 | 0.709 | 2.25 | 33 | 2 (C-4)a. |
| 21 | 1.08 | 2 | 19 | 7a. |
|  | 0.39 |  |  | 17b. |
| 0 | 0.85 | 2 | 22 | 2 (C-4). C-6, iC8a. | a Products removed continuously.
b Products adsorbed.

Table II summarizes olefin polymerization with diborane-treated catalysts. Conversions of 67% of olefin to low molecular weight polymers were achieved by diborane-treated CoO—$SiO_2$—$Al_2O_3$, of which 38 to 55% were in the $C_8$ range and 5 to 15% were in the $C_6$ range and varying amounts were of $C_4$.

Figure 2:
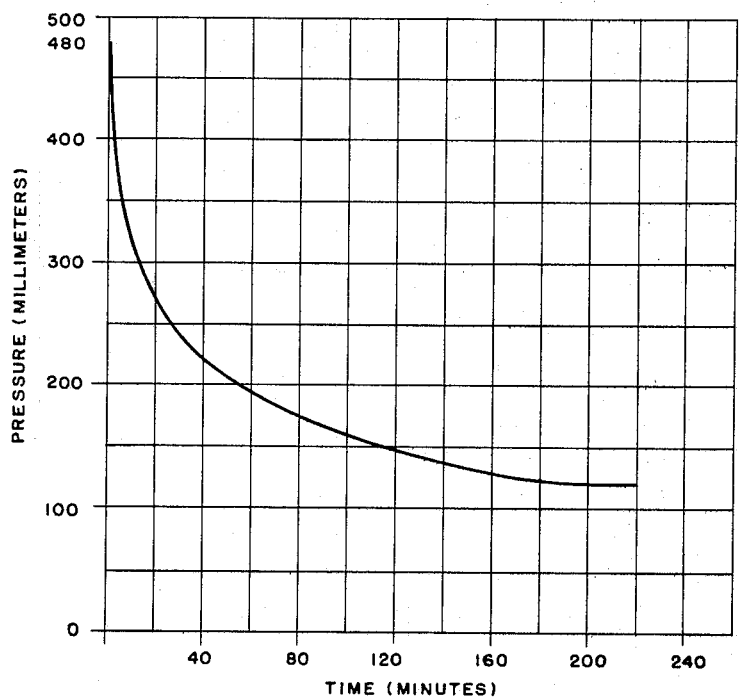

The reaction time as indicated in Table II was used to obtain reasonably complete reaction for comparative purposes and to obtain adequate contact of the ethylene and catalyst as dictated by the design of the experimental system which was used. Ethylene is polymerized very quickly when contacted with the borane impregnated catalyst (CoO—$SiO_2$—$Al_2O_3$) as indicated by the instantaneous drop in ethylene pressure (equilibrium pressure) upon contact as illustrated in FIGURE 2. As a result in commercial application of these catalysts utilizing continuous flow reactors the effective contact time would be only a fraction of those indicated in Table II.

*Table III*

COMPARISON OF DIBORANE-TREATED AND UNTREATED CoO—$SiO_2$—$Al_2O_3$ CATALYST FOR ETHYLENE POLYMERIZATION

| Temp.,° C. | Press., Atmos. | Time, Hrs. | Ethylene Reacted and/or Adsorbed, Percent | Number of Products Removed Condensation at −78° C. | Number of Products Removed Heating Cat. Bed at 100° C. |
|---|---|---|---|---|---|
| CoO—$SiO_2$—$Al_2O_3$ | | | | | |
| 21 | 0.49 | 2 | 0 | 0 | 0 |
| $B_2H_6$ Treated CoO—$SiO_2$—$Al_2O_3$ | | | | | |
| 21 | 0.11 | 2 | 71 | 13 | 11 |
| 22 | 0.6 | 3 | 59 | 15 | 14 |
| 22 | 0.6 | 3 | 50 | 15 | 12 |
| 21 | 0.39 | 16 | 1 35 | 17 | 18 |
| 23 | 0.53 | 2 | 15 | 21 |  |
| 21 | 0.26 | 64 | 1 44 | 15 | 15 |
|  |  |  | 2 2 |  |  |

1 Gas uncirculated.
2 Adsorbed product remaining on catalyst was trapped upon completion of series.

Table III provides data on the diborane-treated and the untreated CoO—$SiO_2$—$Al_2O_3$. Conversions were 50 to 71% of olefin to low molecular weight polymers. The untreated CoO—$SiO_2$—$Al_2O_3$ showed no ethylenic conversion. This attests to the necessity for the diborane treatment.

*Table IV*

CATALYST EFFECT ON ISOMERIZATION

| $B_2H_6$ Modified Catalyst | Feed Reaction Studied | Temp.,° C. | Time, Hours | Reaction, Percent |
|---|---|---|---|---|
| $SiO_2$—$Al_2O_3$ | Isom. of n-pentane | 22 | 4 | 0 |
| $SiO_2$—$Al_2O_3$ | do | 100 | 2 | 0 |
| CoO—$SiO_2$—$Al_2O_3$ | do | 22 | 3 | 0 |
| CoO—$SiO_2$—$Al_2O_3$ | do | 100 | 2 | 0 |

Table IV substantiates the specificity of diborane-treated catalysts for olefin polymerization. No paraffin isomerization occurs when n-pentane is contacted.

The best mode contemplated for carrying out the invention is as follows:

A solution is made of 39.7 grams of $AlCl_3$—$6H_2O$ which had been dissolved in 45 ml. of water and 200 grams of Ludox silica sol which had been dissolved in 1450 ml. of water. 250 ml. of concentrated $NH_4OH$ solution are diluted to 600 ml. with water and added slowly to the aluminum chloride-silica sol mixture. The resulting gel, slightly viscous and with a pH of 9.5 is transferred to a Buchner funnel and filtered. The precipitate is washed with 2 liters of 1% $NH_4OH$, reslurried with 1 liter of water, acidified with acetic acid and stirred to maintain the suspension. 246 grams of $CoCl_2.6H_2O$ are dissolved in 200 ml. of water. Concentrated $NH_4OH$ diluted with an equal volume of water, is added until the $CoCl_2$ solution has a pH of 7. The neutralized $CoCl_2$ is then added to the suspended silica-alumina gel while stirring. The precipitate is filtered and dried for 16 hours at 220° F. The dried material is calcined for 5 hours at 950° F. and then ground to a fine powder which is pelleted with a hydrogenated vegetable fat. This pelleted catalyst is calcined for 5 hours at 950° F. If carbon is evident an additional 3 hours of calcining is done at 950° F.

Ten grams of the 5% CoO-84% $SiO_2$-11% $Al_2O_3$ catalyst are placed on a porous fritted disk in a two-necked flask reactor and heated under vacuum for 15 minutes at 100° C. to remove adsorbed water. The catalyst is cooled to room temperature. Diborane is introduced through an inlet tube from a cylinder and circulated through the catalyst bed by condensation and subsequent vaporization at half-hour intervals. The diborane treatment is continued for 4 hours at room temperature at which time the catalyst has acquired 0.51 millimole of $B_2H_6$ per gram of catalyst, and 1.69 moles of hydrogen are evolved for each mole of $B_2H_6$ reacted with the catalyst surface.

The diborane-treated 5% CoO-84% $SiO_2$-11% $Al_2O_3$ is stored in the evacuated reactor until tested for ethylene polymerization activity. Ethylene is introduced through the inlet tube at an initial pressure of 0.5 atmosphere. An operative pressure range is 0.1 to 2 atmospheres; economic and equipment factors make 0.25 to 0.75 atmosphere preferred. The reaction temperature is controlled at 21° C. Operable temperatures are 0° to 50° C. with 10° to 30° C. preferred. Operating temperature depends on feed stock composition, desired product distribution and equipment requirements as to space velocity. This particular reaction lasted for 2 hours with circulation over the catalyst bed provided by condensation and subsequent vaporization of the hydrocarbon at ½ hour intervals.

In the production of low molecular weight polymeric material, 71% of the ethylene fed was consumed, the major portion of which was converted to $C_6$ and $C_8$ hydrocarbons. There were 13 chemical individuals noted in the products removed by condensation, and 11 chemical individuals in the products removed by desorption.

We claim:
1. A catalyst useful for the polymerization of ethylene to low molecular weight polymers consisting of cobalt oxide on a support selected from the group consisting of silica-alumina, alumina, alumina-magnesia and silica-alumina-magnesia treated with diborane.
2. A process for polymerizing ethylene to a low molecular weight polymer which comprises passing ethylene over the catalyst of claim 1 at a temperature of from 0° to 50° C. and at a pressure of from 0.1 to 2 atmospheres.

References Cited by the Examiner
UNITED STATES PATENTS

| | | | |
|---|---|---|---|
| 2,381,198 | 8/1945 | Bailey et al. | 260—683.15 |
| 2,500,197 | 3/1950 | Michael et al. | 260—683.15 |
| 2,692,261 | 10/1954 | Peters et al. | 260—683.15 |
| 2,829,981 | 4/1958 | Shapiro | 117—100 |
| 2,867,675 | 1/1959 | Shapiro et al. | 260—683.15 |
| 2,892,826 | 6/1959 | Peters et al. | 252—432 |
| 2,898,326 | 8/1959 | Peters et al. | 252—432 |

References Cited by the Applicant

Ind. & Eng. Chem., vol. 41, pp. 2564–2573 (1949).

PAUL M. COUGHLAN, *Primary Examiner.*
MILTON STERMAN, ALPHONSO D. SULLIVAN,
*Examiners.*